United States Patent
Feng

(10) Patent No.: US 10,558,086 B2
(45) Date of Patent: Feb. 11, 2020

(54) LIQUID CRYSTAL DISPLAY PANEL TRACE STRUCTURE AND MANUFACTURING METHOD THEREOF

(71) Applicant: Shenzhen China Star Optoelectronics Technology Co., Ltd., Shenzhen (CN)

(72) Inventor: Tuo Feng, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 267 days.

(21) Appl. No.: 15/321,220

(22) PCT Filed: Jul. 1, 2016

(86) PCT No.: PCT/CN2016/088150
§ 371 (c)(1),
(2) Date: Dec. 22, 2016

(87) PCT Pub. No.: WO2017/215049
PCT Pub. Date: Dec. 21, 2017

(65) Prior Publication Data
US 2017/0363900 A1    Dec. 21, 2017

(30) Foreign Application Priority Data
Jun. 15, 2016    (CN) .......................... 2016 1 0421590

(51) Int. Cl.
*G02F 1/1337*    (2006.01)

(52) U.S. Cl.
CPC ............................. *G02F 1/133711* (2013.01)

(58) Field of Classification Search
None
See application file for complete search history.

(56) References Cited

U.S. PATENT DOCUMENTS

| | | | | |
|---|---|---|---|---|
| 2010/0045886 A1* | 2/2010 | Kwak | ............... | G02F 1/133351 349/40 |
| 2011/0310342 A1* | 12/2011 | Kim | .................. | G02F 1/133351 349/149 |
| 2013/0293819 A1* | 11/2013 | Liao | ....................... | G02F 1/1345 349/142 |
| 2013/0307761 A1* | 11/2013 | Kwak | .................. | G09G 3/3696 345/87 |
| 2015/0062473 A1* | 3/2015 | Nishino | ............ | G02F 1/136204 349/40 |

* cited by examiner

*Primary Examiner* — Edward J Glick
*Assistant Examiner* — David Y Chung

(57) ABSTRACT

A liquid crystal display panel trace structure and a manufacturing method thereof are disclosed. The trace structure includes a common curing pad, a curing bus, at least one assist curing pad receiving a sub common voltage, each of remaining liquid crystal display panels corresponding to one of the assist curing pads, at least one curing assist line, the curing assist line transmitting the sub common voltage to each of remaining liquid crystal display panels.

16 Claims, 2 Drawing Sheets

LIQUID CRYSTAL DISPLAY PANEL TRACE STRUCTURE AND MANUFACTURING METHOD THEREOF

RELATED APPLICATIONS

This application is a National Phase of PCT Patent Application No. PCT/CN2016/088150 having International filing date of Jul. 1, 2016, which claims the benefit of priority of Chinese Patent Application No. 201610421590.4 filed on Jun. 15, 2016. The contents of the above applications are all incorporated by reference as if fully set forth herein in their entirety.

Field and Background of the Invention

The present invention relates to display technology, and particularly to a liquid crystal display panel trace structure and a manufacturing method thereof.

Generally, curing for medium and small sized liquid crystal displays involves two or more than two liquid crystal display panels located on a same mask. This is because alignment needs to be performed before the curing, thus a trace structure needs to be disposed around the display panels in advance.

Existing trace structures only use a common curing pad. That is, all panels share a common curing pad that is used to receive a common voltage. When differently sized panels are disposed on a same mask and because panels with different sizes need different common voltages during alignment, existing panels that are connected with the same common curing pad result in different voltages being not able to be input to the panel. Because after the mask is fixed and if the mask is then modified, growth duration would be increased. If the mask is not modified, then alignment of each panel is not good, resulting in worse display quality of the liquid crystal display panels.

Thus, it is necessary to provide a liquid crystal display panel trace structure and a manufacturing method thereof, in order to solve problems of existing technology.

SUMMARY OF THE INVENTION

The present invention aims to provide a liquid crystal display panel trace structure and a manufacturing method thereof, to solve the technical problems of different voltages being not able to be input to the liquid crystal display panel, resulting in bad alignment and affecting display in trace structure of existing technology.

To solve technical problems mentioned above, the present invention provides a liquid crystal display panel trace structure providing a common voltage of alignment to at least two liquid crystal display panels. The liquid crystal display panel trace structure includes: a common curing pad receiving a total common voltage, a curing bus transmitting the total common voltage to one of the liquid crystal display panels, a spare curing pad receiving a spare common voltage, a curing spare line transmitting the spare common voltage, wherein the curing spare line is not connected to one of the liquid crystal display panels, at least one assist curing pad, each of the assist curing pads receiving a sub common voltage, each of the remaining liquid crystal display panels corresponding to one of the assist curing pads, and at least one curing assist line, each of the assist curing pads corresponding to one of the curing assist lines, the curing assist line connecting the curing bus, the curing assist line transmitting the sub common voltage to each of the remaining liquid crystal display panels, in order to transmit different common voltages to each of the liquid crystal display panels. The liquid crystal display panel includes a color film substrate and an array substrate, the color film substrate has a first common voltage, and the array substrate has a second common voltage. The common curing pad receives the first common voltage corresponding to the liquid crystal display panel and the assist curing pad also receives the first common voltage corresponding to the liquid crystal display panel.

To solve the technical problems mentioned above, the present invention provides a liquid crystal display panel trace structure providing a common voltage of alignment to at least two liquid crystal display panels, where the liquid crystal display panel trace structure includes: a common curing pad receiving a total common voltage; a curing bus transmitting the total common voltage to one of the liquid crystal display panels; at least one assist curing pad, each of the assist curing pads receiving a sub common voltage; each of the remaining liquid crystal display panels corresponding to one of the assist curing pads; at least one curing assist line, each of the assist curing pads corresponding to one of the curing assist lines, the curing assist line connecting the curing bus, the curing assist line transmitting the sub common voltage to each of the remaining liquid crystal display panels, in order to transmit different common voltages to each of the liquid crystal display panels.

The present invention also provides a manufacturing method of a liquid crystal display panel trace structure. The liquid crystal display panel trace structure provides a common voltage of alignment to at least two liquid crystal display panels, the trace structure including: a common curing pad, a curing bus, at least one assist curing pad, at least one curing assist line, a spare curing pad, a curing spare line, the common curing pad connected to the curing bus, each of the liquid crystal display panels connected to the curing bus by a total connection line, the spare curing pad connected to the curing spare line, the curing spare line connected to one of the liquid crystal display panels by a spare connection line, the assist curing pad correspondingly connected to one of the curing assist lines, the curing assist line connected to one liquid crystal display panel of remaining liquid crystal display panels by a sub connection line. The manufacturing method includes: using a laser to cut each of the sub connection lines, using laser to cut the total connection line of the liquid crystal display panel to which the assist curing pad corresponds, to obtain a cut point, and using a laser to break through the curing assist line at a position corresponding to the cut point, connecting the cut point of each of the remaining liquid crystal display panels to the curing bus, to connect the curing bus of each of the remaining liquid crystal display panels to the curing assist line corresponding to the liquid crystal display panel.

The liquid crystal display panel trace structure and the manufacturing method thereof according to the present invention, through improving the existing trace structure using the assist curing pad as the common curing pad, different common voltages can be inputted to each liquid crystal display panel, making the alignment effect of each display panel be optimized, and further increasing display effect.

BRIEF DESCRIPTION OF THE SEVERAL VIEWS OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SPECIFIC EMBODIMENTS OF THE INVENTION

Figure 1:
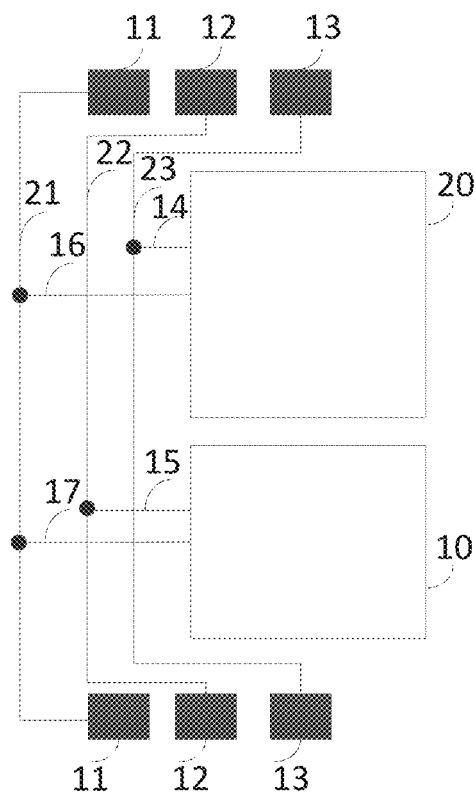
FIG. 1 illustrates a diagram of a trace structure of an existing liquid crystal display panel.

As used in this specification the term "embodiment" means an instance, example, or illustration. In addition, for the articles in this specification and the appended claims, "a" or "an" in general can be interpreted as "one or more" unless specified otherwise or clear from context to determine the singular form.

In the drawings, the same reference numerals denote units with similar structures.

Please refer to FIG. 1, FIG. 1 illustrates a diagram of a trace structure of an existing liquid crystal display panel.

As shown in FIG. 1, the existing liquid crystal display panel trace structure includes a first liquid crystal display panel 10, a second liquid crystal display panel 20, a common curing pad 11, a spare curing pad 12, and an assist curing pad 13. The common curing pad 11 provides a connection point of a common voltage, and is specifically used for inputting a common voltage CF-com of the color film substrate. The spare curing pad 12 provides the connection point of a common voltage Acom1 of the array substrate to the first liquid crystal display panel 10, and the assist curing pad 13 provides the connection point of a common voltage Acom2 of the array substrate to the second liquid crystal display panel 20.

The first liquid crystal display panel 10 and the spare curing line 22 are connected through a spare connection line 15, the second liquid crystal display panel 20 and an assist curing line 23 are connected through a sub connection line 14, and the second liquid crystal display panel 20 and a total curing line 21 are connected through a total connection line 16, the first liquid crystal display panel 10 and the total curing line 21 are connected through a total connection line 17. It can be seen that, each of the liquid crystal display panels is connected to a same common curing pad 11.

Figure 2:
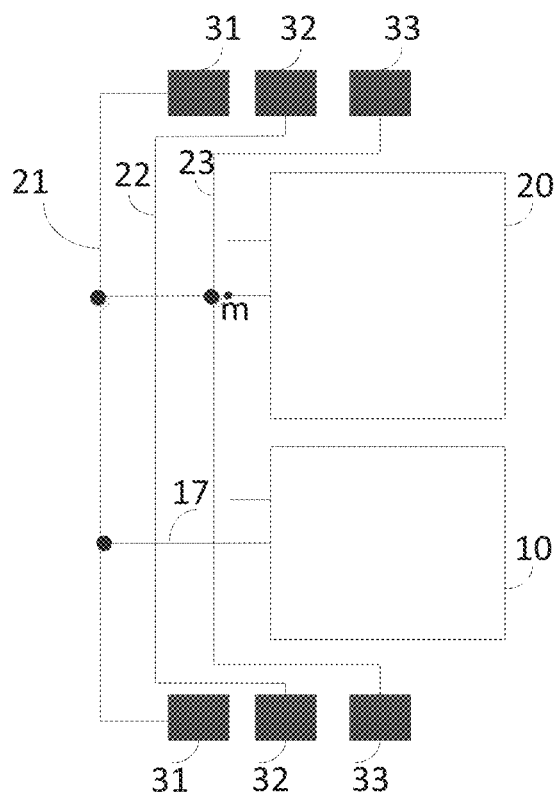
FIG. 2 illustrates a diagram of a trace structure of a liquid crystal display panel of the present invention.

Please refer to FIG. 2, FIG. 2 illustrates a diagram of a trace structure of the liquid crystal display panel of the present invention.

The trace structure provides a common voltage of alignment to at least two liquid crystal display panels and includes a common curing pad, a curing bus, at least one assist curing pad, at least one curing assist line. The common curing pad is used for receiving total common voltage, the curing bus is used for transmitting the total common voltage to one of the liquid crystal display panels, each of the assist curing pad is used for receiving sub common voltage. Each of the remaining liquid crystal display panels corresponds to one of the assist curing pads and each of the assist curing pads corresponds to one of the curing assist line. That is, each of the assist curing pads corresponds to a liquid crystal display panel, and corresponds to a curing assist line. The curing assist line is connected to the curing bus, and the curing assist line is used for transmitting the sub common voltage to each of the remaining liquid crystal display panels, thus different common voltages can be inputted to each of the liquid crystal display panels. The common voltage can be a common voltage of the color film substrate side.

Specifically, as shown in FIG. 2, for example, the common voltage is provided to two liquid crystal display panels. The trace structure includes a common curing pad 31, a spare curing pad 32, an assist curing pad 33, a curing bus 21, a curing spare line 22, and a curing assist line 23. The common curing pad 31 is used for receiving total common voltage, the curing bus 21 is used for transmitting the total common voltage CF-com1 to the first liquid crystal display panel 10, the spare curing pad 32 is used for receiving the common voltage at the array substrate of the first liquid crystal display panel 10, and the connection between the spare curing pad 32 and the first liquid crystal display panel 10 is cut. The assist curing pad 33 is used for receiving sub common voltage, the second liquid crystal display panel 20 is connected to the curing assist line 23, the curing assist line 23 is also connected to the curing bus 21, the curing assist line 23 is used for transmitting the sub common voltage CF-com2 to the second liquid crystal display panel 20. It can be seen that the first liquid crystal display panel 10 inputs the total common voltage CF-com1 through the common curing pad 31, the second liquid crystal display panel 20 inputs the sub common voltage CF-com2 through the assist curing pad 33. That is, different common voltages are inputted to each of the liquid crystal display panels.

Generally, when the alignment film is curing, it is required to perform an initial alignment to the liquid crystal molecular through voltage difference between the common voltage of the color film substrate side and the pixel voltage of the array substrate side. Usually, pixel voltage of the array substrate side is constant and the voltage difference is mainly controlled through the common voltage of the color film substrate side. Thus, the alignment process mainly depends on the common voltage of the color film substrate side.

Preferably, the liquid crystal display panel includes a color film substrate and array substrate. The color film substrate has a first common voltage and the array substrate has a second common voltage. The common curing pad is used for receiving the first common voltage of the corresponding liquid crystal display panel, and the assist curing pad is also used for receiving the first common voltage of the corresponding liquid crystal display panel. For example, the color film substrate of the first liquid crystal display panel 10 has a first common voltage CF-com1, the array substrate has a second common voltage Acom1, the color film substrate of the second liquid crystal display panel has a second common voltage CF-com2, the array substrate has a second common voltage Acom2, and the common curing pad 31 is used for receiving the first common voltage CF-com1 of the first liquid crystal display panel 10. The assist curing pad 33 is used for receiving the first common voltage CF-com2 of the second liquid crystal display panel. Because the assist curing pad 33 originally used for inputting the common voltage of the array substrate side is now used for inputting the common voltage of the color film substrate side, this is convenient for controlling the value of the voltage inputted by each display panel.

Preferably, the value of the corresponding first common voltage is set according to a size of the liquid crystal display panel. For example, when the size of each liquid crystal display panel is the same, the value of the voltage outputted by each liquid crystal display panel is almost the same. For example, when the size of each liquid crystal display panel is different, the voltage outputted by each liquid crystal display panel is different. Because the layout of the existing trace structure is not needed to be modified while the display effect is increased, product cost is decreased.

Preferably, when sizes of the liquid crystal display panels are different, the first common voltage is different. That is, the first common voltage of each liquid crystal display panel is different. Because when the size of the liquid crystal display panel is different, the common voltage of the color film substrate side needed to be inputted to each liquid crystal display panel is different, then better alignment of the panel can be performed, thus the display effect of each display panel is optimized.

Preferably, the curing bus is connected to one of the liquid crystal display panels and the curing assist line is connected to the corresponding one of the remaining liquid crystal display panels. For example, the curing bus 21 is connected to the first liquid crystal display panel 10, the curing assist line 23 is connected to the second liquid crystal display panel 20. Because of this connection method, it is convenient for inputting the common voltage sequentially according to the arrangement order of the liquid crystal display panel, avoiding miss-operation, and increasing process efficiency.

Preferably, a value of the total common voltage is set according to length of a trace between the liquid crystal display panel and the common curing pad. The trace, for example, is the length of the line between the first liquid crystal display panel 10 and the common curing pad 31.

Preferably, a value of the sub common voltage is set according to a length of a trace between the liquid crystal display panel and the assist curing pad. The trace, for example, is the length of the line between the second liquid crystal display panel 20 and the assist curing pad 33.

When the step of the same process is required, because the length of the trace between each display panel and each curing pad is different, thus a resistance value of the corresponding trace of each panel, resulting in difference in voltage actually inputted to each panel, thus voltages difference easily occurs during the alignment process. Because the value of the first common voltage CF-com inputted to each liquid crystal display panel is set according to the length of the trace, thus when the curing is performed on the panel of uniform size, the first common voltage inputted to the liquid crystal display panel can be ensured to be the same.

The liquid crystal display panel trace structure of the present invention, through using the curing pad originally transmitting the common voltage of the array substrate side for transmitting the common voltage of the color film substrate side, voltages with different values can be inputted to different liquid crystal display panels, the optimized alignment can be performed on the liquid crystal display panels of different sizes, and the display effect is increased.

Figure 3:
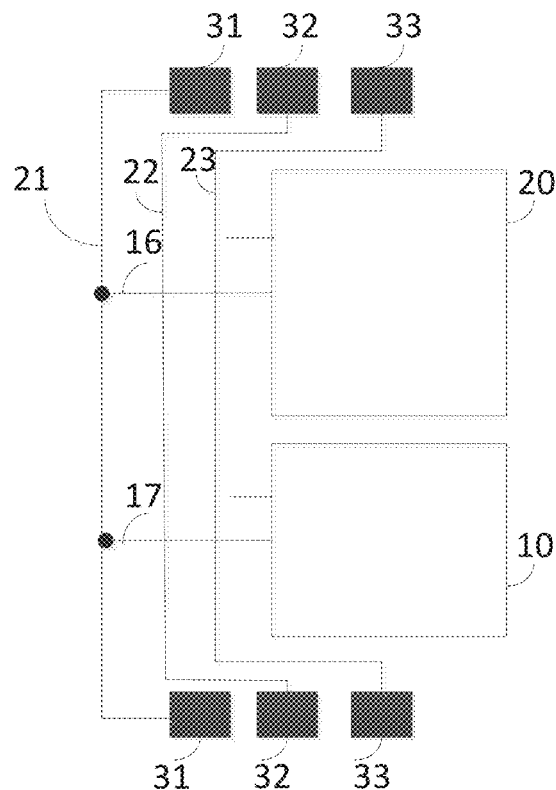
FIG. 3 illustrates a diagram of the first step of a manufacturing method of the liquid crystal display panel trace structure of the present invention.
Figure 4:
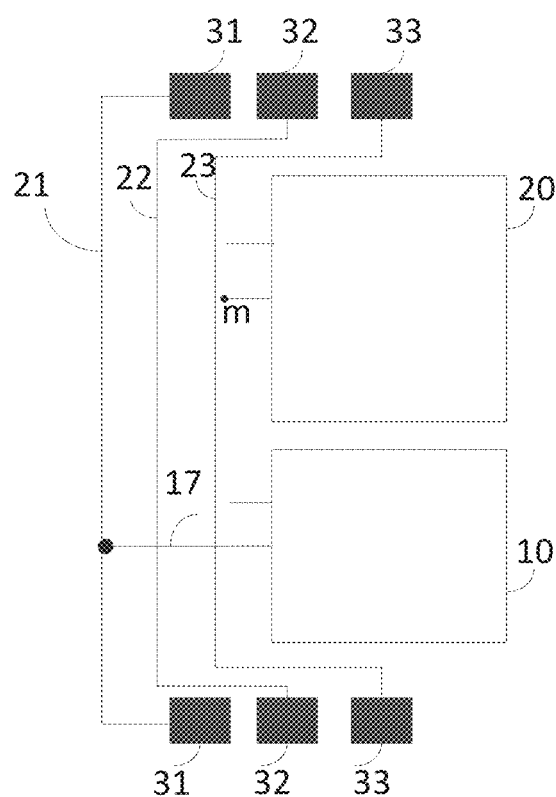
FIG. 4 illustrates a diagram of the second step of the manufacturing method of the liquid crystal display panel trace structure of the present invention.

Please refer to FIG. 3-4, FIG. 3 illustrates a diagram of a first step of the manufacturing method of the liquid crystal display panel trace structure of the present invention.

In an initial state, the trace structure includes a common curing pad, a curing bus, at least one assist curing pad, at least one curing assist line, a spare curing pad, a curing spare line. The common curing pad is connected to the curing bus, each liquid crystal display panel is connected to the curing bus through a total connection line. The spare curing pad is connected to the curing spare line, the curing spare line is connected to one of the liquid crystal display panels through a spare connection line, the assist curing pad is correspondingly connected to one of the curing assist lines, the curing assist line is connected to one of the remaining liquid crystal display panels through a sub connection line. The manufacturing method of the trace structure includes:

In 101, using a laser to cut each of the sub connection lines;

In using two display panel for example, as shown in FIG. 1, first using the laser to cut the sub connection line 14 of the second liquid crystal display panel. During the alignment, the common voltage Acom2 of the array substrate side of the second liquid crystal display panel is in a floating state. A diagram after being cut is shown in FIG. 3.

In 102, using the laser to cut a total connection line of the liquid crystal display panel to which the assist curing pad corresponds, to obtain a cut point.

That is, the total connection lines of the liquid crystal display panels not corresponding to the spare curing pad 32 are cut, combined with FIG. 1, using laser to cut the total connection line 16 of the second liquid crystal display panel, to obtain the cut point m. A diagram after being cut is shown in FIG. 4.

In 103, using the laser to break through the curing assist line at a position corresponding to the cut point, and connecting the cut point of each of the remaining liquid crystal display panels to the curing bus, to connect the curing bus of each of the remaining liquid crystal display panels to the curing assist line corresponding to the liquid crystal display panel.

Combined with FIG. 2, using the laser to break through the curing assist line 23 at a position corresponding to the cut point, and connecting the cut point of the second liquid crystal display panel 20 to the curing bus 21, to connect the curing bus 21 of the second liquid crystal display panel 20 to the curing assist line 33, and also to the liquid crystal display panel 20.

Preferably, the aforementioned method could further include:

In 104, using laser to cut the spare connection line.

Combined with FIG. 1, the spare connection line 15 of the first liquid crystal display panel 10 is cut, a diagram after being cut is shown as FIGS. 2 and 3. Thus the common voltage Acom of the array substrate side of each liquid crystal display panel is in a floating state, the alignment effect is further increased.

In summary, different alignment voltages are respectively inputted to the first liquid crystal display panel 10 and the second liquid crystal display panel 20 for performing the alignment. Similarly, different CF-com alignment voltages are respectively inputted to a plurality of liquid crystal display panels in a process step, for performing the alignment, so as to ensure the alignment effect of each liquid crystal display panel is optimized.

The manufacturing method of the liquid crystal display panel trace structure of the present invention, through cutting the line between the curing assist line and the liquid crystal display panel, cutting the line between at least one liquid crystal display panel and the curing bus, and connecting the cut line to the curing assist line and the curing bus, thus different voltages can be inputted to each liquid crystal display panel, making the alignment effect of each display panel be optimized, and increasing the display effect.

In summary, although the preferable embodiments of the present invention have been disclosed above, the embodiments are not intended to limit the present invention. A person of ordinary skill in the art, without departing from the spirit and scope of the present invention, can make various modifications and variations. Therefore, the scope of the invention is defined in the claims.

What is claimed is:

1. A liquid crystal display panel trace structure, wherein the liquid crystal display panel trace structure provides a common voltage of alignment to at least two liquid crystal display panels, the liquid crystal display panel trace structure comprising:
   a common curing pad receiving a total common voltage;
   a curing bus transmitting the total common voltage only to a first liquid crystal display panel;
   a spare curing pad receiving a spare common voltage;
   a curing spare line transmitting the spare common voltage, wherein the curing spare line is not connected to the one of the liquid crystal display panels;
   at least one assist curing pad, each of the assist curing pads receiving a sub common voltage; each of remaining liquid crystal display panels corresponding to one of the assist curing pads, and the first liquid crystal display panel corresponds to none of the assist curing pads; and
   at least one curing assist line, each of the assist curing pads corresponding to one of the curing assist lines, the curing assist line connecting the curing bus, the curing assist line transmitting the sub common voltage to each of the remaining liquid crystal display panels, in order to transmit different common voltages to each of the liquid crystal display panels;
   wherein the liquid crystal display panel comprises a color film substrate and an array substrate, the color film substrate has a first common voltage, the array substrate has a second common voltage; and
   wherein the common curing pad receives the first common voltage corresponding to the liquid crystal display panel, and the assist curing pad also receives the first common voltage corresponding to the liquid crystal display panel.

2. The liquid crystal display panel trace structure of claim 1, wherein a value of the first common voltage corresponding to the liquid crystal display panel is set according to a size of the liquid crystal display panel.

3. The liquid crystal display panel trace structure of claim 2, wherein different sizes of the liquid crystal display panels correspond to different first common voltages.

4. The liquid crystal display panel trace structure of claim 1, wherein the curing bus is connected to the one of the liquid crystal display panels and the curing assist line is connected to a corresponding one of the remaining liquid crystal display panels.

5. The liquid crystal display panel trace structure of claim 1, wherein a value of the total common voltage is set according to a length of a trace between the liquid crystal display panel and the common curing pad corresponding to the liquid crystal display panel.

6. The liquid crystal display panel trace structure of claim 1, wherein a value of the sub common voltage is set according to a length of a trace between the liquid crystal display panel and the assist curing pad corresponding to the liquid crystal display panel.

7. A liquid crystal display panel trace structure, wherein the liquid crystal display panel trace structure provides a common voltage of alignment to at least two liquid crystal display panels, the liquid crystal display panel trace structure comprising:
   a common curing pad receiving a total common voltage;
   a curing bus transmitting the total common voltage only to a first liquid crystal display panel;
   at least one assist curing pad, each of the assist curing pads receiving a sub common voltage; each of remaining liquid crystal display panels corresponding to one of the assist curing pads, and the first liquid crystal display panel corresponds to none of the assist curing pads; and
   at least one curing assist line, each of the assist curing pads corresponding to one of the curing assist lines, the curing assist line connecting the curing bus, the curing assist line transmitting the sub common voltage to each of the remaining liquid crystal display panels, in order to transmit different common voltages to each of the liquid crystal display panels.

8. The liquid crystal display panel trace structure of claim 7, wherein the liquid crystal display panel comprises a color film substrate and an array substrate, the color film substrate has a first common voltage, the array substrate has a second common voltage;
   the common curing pad receives the first common voltage corresponding to the liquid crystal display panel; the assist curing pad also receives the first common voltage corresponding to the liquid crystal display panel.

9. The liquid crystal display panel trace structure of claim 8, wherein a value of the first common voltage corresponding to the liquid crystal display panel is set according to a size of the liquid crystal display panel.

10. The liquid crystal display panel trace structure of claim 9, wherein different sizes of the liquid crystal display panels correspond to different first common voltages.

11. The liquid crystal display panel trace structure of claim 7, wherein the curing bus is connected to the one of the liquid crystal display panels and the curing assist line is connected to a corresponding one of the remaining liquid crystal display panels.

12. The liquid crystal display panel trace structure of claim 7, wherein a value of the total common voltage is set according to a length of a trace between the liquid crystal display panel and the common curing pad corresponding to the liquid crystal display panel.

13. The liquid crystal display panel trace structure of claim 7, wherein a value of the sub common voltage is set according to a length of a trace between the liquid crystal display panel and the assist curing pad corresponding to the liquid crystal display panel.

14. The liquid crystal display panel trace structure of claim 7, wherein the trace structure further comprises:
   a spare curing pad receiving a spare common voltage;
   a curing spare line transmitting the spare common voltage; wherein the curing spare line is not connected to the one of the liquid crystal display panels.

15. A manufacturing method for a liquid crystal display panel trace structure, wherein the liquid crystal display panel trace structure provides a common voltage of alignment to at least two liquid crystal display panels, the liquid crystal display panel trace structure comprising:
   a common curing pad, a curing bus, at least one assist curing pad, at least one curing assist line, a spare curing pad, a curing spare line; the common curing pad connected to the curing bus, wherein each of the liquid crystal display panels are connected to the curing bus by a total connection line;
   wherein the spare curing pad is connected to the curing spare line, the curing spare line is connected to one of the liquid crystal display panels by a spare connection line, the assist curing pad correspondingly connected to one of the curing assist lines, the curing assist line connected to one liquid crystal display panel of remaining liquid crystal display panels by a sub connection line;

the manufacturing method comprising:

using a laser to cut each of the sub connection lines;

using the laser to cut the total connection line of the liquid crystal display panel to which the assist curing pad corresponds, to obtain a cut point; and using the laser to break through the curing assist line at a position corresponding to the cut point, and connecting the cut point of each of the remaining liquid crystal display panels to the curing bus, to connect the curing bus of each of the remaining liquid crystal display panels to the curing assist line corresponding to the liquid crystal display panel.

16. The manufacturing method for a liquid crystal display panel trace structure of claim 15, further comprising: using the laser to cut the spare connection line.

* * * * *